United States Patent
Frederiksen et al.

(10) Patent No.: US 10,616,911 B2
(45) Date of Patent: Apr. 7, 2020

(54) TWO-STEP SIGNALING OF UPLINK SCHEDULING ASSIGNMENTS

(71) Applicant: Nokia Solutions and Networks Oy, Espoo (FI)

(72) Inventors: Frank Frederiksen, Klarup (DK); Claudio Rosa, Randers (DK); Esa Tapani Tiirola, Kempele (FI); Timo Erkki Lunttila, Espoo (FI); Klaus Hugl, Vienna (AT)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 15/774,685

(22) PCT Filed: Oct. 13, 2016

(86) PCT No.: PCT/EP2016/074580
§ 371 (c)(1),
(2) Date: May 9, 2018

(87) PCT Pub. No.: WO2017/084813
PCT Pub. Date: May 26, 2017

(65) Prior Publication Data
US 2018/0352562 A1    Dec. 6, 2018

(30) Foreign Application Priority Data

Nov. 17, 2015 (EP) .................. PCT/EP2015/076825

(51) Int. Cl.
*H04W 72/12* (2009.01)
*H04W 72/14* (2009.01)
*H04L 5/00* (2006.01)
*H04W 74/08* (2009.01)

(52) U.S. Cl.
CPC ....... *H04W 72/1268* (2013.01); *H04W 72/14* (2013.01); *H04L 5/0053* (2013.01); *H04W 74/0808* (2013.01)

(58) Field of Classification Search
None
See application file for complete search history.

(56) References Cited

FOREIGN PATENT DOCUMENTS

JP    2012165471 A    8/2012

OTHER PUBLICATIONS

ETRI; "Discussion on the UL LBT for LAA" 3GPP TSG RAN WG1 Meeting #81, May 25-19, 2015. R1-153001.
3GPP 3GPP TS 36.213 v12.6.0 (Jun. 2015); 3rd Generation Partnership Project; Technical Specification Group Radio Access Network; Evolved Universal Terrestrial Radio Access (E-UTRA); Physical layer procedures (Release 12);Jun. 2015.
"Physical Layer Aspects of Short TTI for Uplink Transmissions," Ericsson, 3GPP TSG RAN WG1 Meeting #83, R1-157149, Nov. 15-22, 2015, Anaheim, USA, 4 pgs.
(Continued)

*Primary Examiner* — Diane L Lo
(74) *Attorney, Agent, or Firm* — Harrington & Smith

(57) ABSTRACT

A method including receiving at a wireless communication device first and second scheduling information indicative of attributes related to a data transmission. The first scheduling information including information indicative of contents attributes of the data transmission, and the subsequently received second scheduling information being indicative of time attributes of the data transmission.

34 Claims, 7 Drawing Sheets

(56) References Cited

OTHER PUBLICATIONS

"Physical Layer Aspects of TTI Shortening for Downlink Transmissions," Ericsson, 3GPP TSG RAN WG1 Meeting #83, R1-157148, Nov. 15-22, 2015, Anaheim, USA, 5 pgs.
"Discussion on Solutions for Latency Reducation," Alcatel-Lucent Shanghai Bell et al., 3GPP TSG-RAN WG2 Meeting #91, R2-153702, Aug. 24-28, 2015, Beijing, China, 3 pgs.
"On DL/UL burst and subframe indication for LAA", Nokia Networks, 3GPP TSG RAN WG1 Meeting #83, R1-157133, Nov. 2015, 5 pages.

TWO-STEP SIGNALING OF UPLINK SCHEDULING ASSIGNMENTS

FIELD

The present invention relates to the field of wireless communications. More specifically, the present invention relates to methods, apparatus, systems and computer programs for scheduling uplink data transmissions.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multiway calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimizing the 3GPP LTE radio access technologies.

Communication systems may be configured to use a mechanism for aggregating radio carriers to support wider transmission bandwidth. In LTE this mechanism is referred to as carrier aggregation (CA) and can, according to LTE Rel. 12 specifications, support a transmission bandwidth up to 100 MHz. A communication device with reception and/or transmission capabilities for CA can simultaneously receive and/or transmit on multiple component carriers (CCs) corresponding to multiple serving cells, for which the communication device has acquired/monitors system information needed for initiating connection establishment. When CA is configured, the communication device has only one radio resource control (RRC) connection with the network. At RRC connection establishment/reestablishment or handover, one serving cell provides the non-access stratum (NAS) mobility information, such as tracking area identity information. At RRC connection (re)establishment or handover, one serving cell provides the security input. This cell is referred to as the primary serving cell (PCell), and other cells are referred to as the secondary serving cells (SCells). Depending on capabilities of the communication device, SCells can be configured to form together with the PCell a set of serving cells under CA. In the downlink, the carrier corresponding to the PCell is the downlink primary component carrier (DL PCC), while in the uplink it is the uplink primary component carrier (UL PCC). A SCell needs to be configured by the network using RRC signaling before usage in order to provide necessary information, such as DL radio carrier frequency and physical cell identity (PCI) information, to the communication device. A SCell for which such necessary information has been provided to a communication device is referred to as configured cell for this communication device. The information available at the communication device after cell configuration is in particular sufficient for carrying out cell measurements. A configured SCell is in a deactivated state after cell configuration for energy saving. When a SCell is deactivated, the communication device does in particular not monitor/receive the physical dedicated control channel (PDCCH) or physical downlink shared channel (PDSCH) in the SCell. In other words the communication device cannot communicate in a SCell after cell configuration, and the SCell needs to be activated before data transmission from/the communication device can be initiated in the SCell. LTE provides for a mechanism for activation and deactivation of SCells via media access control (MAC) control elements to the communication device.

Communication systems may be configured to support simultaneous communication with two or more access nodes. In LTE this mechanism is referred to as dual connectivity (DC). More specifically, a communication device may be configured in LTE to communicate with a master eNB (MeNB) and a secondary eNB (SeNB). The MeNB may typically provide access to a macrocell, while the SeNB may provide on a different radio carrier access to a relatively small cell, such as a picocell. Only the MeNB maintains for the communication device in DC mode a connection via an S1-MME interface with the mobility management entity (MME), that is, only the MeNB is involved in mobility management procedures related to a communication device in DC mode. LTE supports two different user plane architectures for communication devices in DC mode. In the first architecture (split bearer) only the MeNB is connected via an S1-U interface to the serving gateway (S-GW) and the user plane data is transferred from the MeNB to the SeNB via an X2 interface. In the second architecture the SeNB is directly connected to the S-GW, and the MeNB is not involved in the transport of user plane data to the SeNB. DC in LTE reuses with respect to the radio interface concepts introduced for CA in LTE. A first group of cells, referred to as master cell group (MCG), can be provided for a communication device by the MeNB and may comprise one PCell and one or more SCells, and a second group of cells, referred to as seconday cell group (SCG), is provided by the SeNB and may comprise a primary SCell (PSCell) with functionality similar to the PCell in the MCG, for example with regard to uplink control signaling from the communication device. This second group of cells may further comprise one or more SCells.

Future networks, such as 5G, may progressively integrate data transmissions of different radio technologies in a communication between one or more access nodes and a communication device. Accordingly, communication devices may be able to operate simultaneously on more than one radio access technology, and carrier aggregation and dual connectivity may not be limited to the use of radio carriers of only one radio access technology. Rather, aggregation of radio carriers according to different radio access technologies and concurrent communication on such aggregated carriers may be supported. Small cells, such as picocells, may progressively be deployed in future radio access networks to match the increasing demand for system capacity due to the growing population of communication devices and data applications. Integration of radio access technologies and/or a high number of small cells may bring about that a communication device may detect more and more cells in future networks which are suitable candidates for connection establishment. Enhancements of carrier aggregation and dual connectivity mechanisms may be needed to make best use of these cells in future radio access networks. Such enhancements may allow for an aggregation of a high number of radio carriers at a communication device, for example up to 32 are currently specified in LTE Rel. 13, and in particular an integration of radio carriers operated on unlicensed spectrum.

Aggregation of radio carriers for communication to/from a communication device and simultaneous communication with two or more access nodes may in particular be used for operating cells on unlicensed (license exempt) spectrum. Wireless communication systems may be licensed to operate in particular spectrum bands. A technology, for example LTE, may operate, in addition to a licensed band, in an unlicensed band. LTE operation in the unlicensed spectrum may be based on the LTE Carrier Aggregation (CA) framework where one or more low power secondary cells (SCells) operate in the unlicensed spectrum and may be either downlink-only or contain both uplink (UL) and downlink (DL), and where the primary cell (PCell) operates in the licensed spectrum and can be either LTE Frequency Division Duplex (FDD) or LTE Time Division Duplex (TDD).

Two proposals for operating in unlicensed spectrum are LTE Licensed-Assisted Access (LAA) and LTE in Unlicensed Spectrum (LTE-U). LTE-LAA specified in 3GPP as part of Rel. 13 and LTE-U as defined by the LTE-U Forum may imply that a connection to a licensed band is maintained while using the unlicensed band. Moreover, the licensed and unlicensed bands may be operated together using, e.g., carrier aggregation or dual connectivity. For example, carrier aggregation between a primary cell (PCell) on a licensed band and one or more secondary cells (SCells) on unlicensed band may be applied, and uplink control information of the SCells is communicated in the PCell on licensed spectrum.

In an alternative proposal stand-alone operation using unlicensed carrier only may be used.

In standalone operation at least some of the functions for access to cells on unlicensed spectrum and data transmission in these cells are performed without or with only minimum assistance or signaling support from license-based spectrum. Dual connectivity operation for unlicensed bands can be seen as an example of the scenario with minimum assistance or signaling from licensed-based spectrum.

Unlicensed band technologies may need to abide by certain rules, e.g. a clear channel assessment procedure, such as Listen-Before-Talk (LBT), in order to provide fair coexistence between LTE and other technologies such as Wi-Fi as well as between LTE operators. In some jurisdictions respective rules may be specified in regulations.

In LTE-LAA, before being permitted to transmit, a user or an access point (such as eNodeB) may, depending on rules or regulatory requirements, need to perform a Clear Channel Assessment (CCA) procedure, such a Listen-Before-Talk (LBT). The user or access node may, for example, monitor a given radio frequency, i.e. carrier, for a short period of time to ensure that the spectrum is not already occupied by some other transmission. The requirements for CCA procedures, such as LBT, vary depending on the geographic region: e.g. in the US such requirements do not exist, whereas in e.g. Europe and Japan the network elements operating on unlicensed bands need to comply with LBT requirements. Moreover, CCA procedures, such as LBT, may be needed in order to guarantee co-existence with other unlicensed band usage in order to enable e.g. fair co-existence with Wi-Fi also operating on the same spectrum and/or carriers. After a successful CCA procedure the user or access point is allowed to start transmission within a transmission opportunity.

The maximum duration of the transmission opportunity may be preconfigured or may be signaled in the system, and may extend over a range of 4 to 13 milliseconds. The access node may be allowed to schedule downlink (DL) transmissions from the access node and uplink (UL) transmissions to the access node within a certain time window. An uplink transmission may not be subject to a CCA procedure, such as LBT, if the time between a DL transmission and a subsequent UL transmission is less than or equal to a predetermined value. Moreover, certain signaling rules, such as Short Control Signaling (SCS) rules defined for Europe by ETSI, may allow for the transmission of control or management information without LBT operation, if the duty cycle of the related signaling does not exceed a certain threshold, e.g. 5%, within a specified period of time, for example 50 ms. The aforementioned SCS rules, for example, can be used by compliant communication devices, referred to as operating in adaptive mode for respective SCS transmission of management and control frames without sensing the channel for the presence of other signals. The term "adaptive mode" is defined in ETSI as a mechanism by which equipment can adapt to its environment by identifying other transmissions present in a band, and addresses a general requirement for efficient operation of communications systems on unlicensed bands. Further, scheduled UL transmissions may in general be allowed without LBT, if the time between a DL transmission from an access node and a subsequent UL transmission is less than or equal to a predetermined value, and the access node has performed a clear channel assessment procedure, such as LBT, prior to the DL transmission. The total transmission time covering both DL transmission and subsequent UL transmission may be limited to a maximum burst or channel occupancy time. The maximum burst or occupancy time may be specified, for example, by a regulator.

Data transmission on an unlicensed band or/and subject to a clear channel assessment procedure cannot occur pursuant to a predetermined schedule in a communication system. Rather, communication devices and access nodes need to determine suitable time windows for uplink transmission and/or downlink transmission. A respective time window may comprise one or more transmission time intervals (TTI), such as subframes in LTE, and is in the following referred to as uplink transmission opportunity or downlink transmission opportunity. A TTI is the time period reserved in a scheduling algorithm for performing a data transmission of a dedicated data unit in the communication system. The determination of uplink transmission opportunities and/or downlink transmission opportunities may be based on parameters related to the communication system, such as a configured pattern governing the sequence of uplink and downlink transmissions in the system. The determination may further be based on rules or regulations specifying a minimum and/or maximum allowed length of uplink transmissions and/or downlink transmissions. The determination of uplink and downlink opportunities may in particular be based on the outcome of a clear channel assessment procedure, and communication devices or access nodes will only start data transmission on a frequency band after having assessed that the frequency band is clear, that is, not occupied by data transmissions from other communication devices or access nodes. Further rules or regulations may govern data transmissions in a communication between an access node and one or more communication devices. These rules may, for example, specify a maximum length of a time window in the communication covering at least one transmission in a first direction, for example in DL in a cellular system from an access node of a cell, and at least one subsequent transmission in the reverse direction, for example in UL from one or more communication devices in the cell. Such a time window comprising one or more DL and UL transmissions is in the following referred to as communication opportunity. DL transmissions may comprise scheduling information which may be transmitted on a DL control channel. The scheduling information may in particular be used for scheduling one or more UL data transmissions and/or one or more DL data transmissions within the current one or more future communication opportunities.

Scheduling information for a data transmission is indicative of an assignment of contents attributes, format attributes and mapping attributes to the data transmission. Mapping attributes relate to one or more channel elements allocated to the transmission on the physical layer. Specifics of the channel elements depend on the radio access technology and may depend on the used channel type. A channel element may relate to a group of resource elements, while each resource element relates to a frequency attribute, for example a subcarrier index (and the respective frequency range) in a system employing orthogonal frequency-division multiplexing (OFDM), and a time attribute, such as the transmission time of an OFDM or Single-Carrier FDMA symbol. A channel element may further relate to a code attribute, such as a cover code or a spreading code, which may allow for parallel data transmission on the same set of resource elements. Illustrative examples for channel elements in LTE are control channel elements (CCE) on the physical downlink control channel (PDCCH) or the enhanced physical downlink control channel (EPDCCH), PUCCH resources on the physical uplink control channel (PUCCH), and physical resource blocks (PRB) on the physical downlink shared channel (PDSCH) and the physical uplink shared channel (PUSCH). It should be understood that each data transmission is associated with the code attributes of the allocated channel elements and the frequency and time attributes of the resource elements in the allocated channel elements. Format attributes relate to the processing of a set of information bits in the transmission prior to the mapping to the allocated channel elements. Format attributes may in particular comprise a modulation and coding scheme used in the transmission and the length of the transport block in the transmission. Contents attributes relate to the user/payload information conveyed through the transmission. In other words, a contents attribute is any information which may in an application finally affect the arrangement of a detected data sequence at the receiving end. Contents attributes may comprise the sender and/or the receiver of the transmission. Contents attributes may further relate to the information bits processed in the transmission, for example some kind of sequence number in a communication. Contents attributes may in particular indicate whether the transmission is a retransmission or relates to a new set of information bits. In case of a hybrid automatic repeat request (HARQ) scheme contents attributes may in particular comprise an indication of the HARQ process number, that is, a HARQ-specific sequence number, the redundancy version (RV) used in the transmission and a new data indicator (NDI).

Scheduling information for a data transmission need not comprise assignment information for the complete set of attributes needed in the data transmission. At least a part of the attributes can be preconfigured, for example through semi-persistent scheduling, and can be used in more than one data transmission. Some of the attributes may be signaled implicitly or may be derivable, for example from timing information. However, dynamic scheduling in a more complex system, such as a cellular mobile network, requires transmission of scheduling information on a DL control channel. In a system employing carrier aggregation the DL scheduling information related to a certain data transmission may be transmitted on a component carrier other than the data transmission. Transmission of a data and scheduling information on different component carriers is referred to as cross-carrier scheduling.

In a cell operated on unlicensed spectrum a communication device may start monitoring channel elements related to a DL control channel carrying scheduling information after detection of DL data burst in the cell. The detection of the DL data burst may be based on the detection of a certain signal in the cell, for example a reference signal, such as a cell reference signal which the communication device may blindly detect, or based on explicit signaling indicative of the presence of the DL data burst. Monitoring channel elements related to a DL control channel may comprise blind detection of scheduling information destined to the communication device. The control channel may be a physical downlink control channel (PDCCH) or enhanced physical downlink control channel (EPDCCH) as specified in LTE or a similar channel. The communication device may further detect a DL data transmission on a data channel, such as a physical downlink shared channel (PDSCH) or a similar channel, based on the detected scheduling information.

A communication system may employ a retransmission mechanism, such as Automatic Repeat Request (ARQ), for handling transmission errors. A receiver in such a system may use an error-detection code, such as a Cyclic Redundancy Check (CRC), to verify whether a data packet was received in error. The receiver may notify the transmitter on a feedback channel of the outcome of the verification by sending an acknowledgement (ACK) if the data packet was correctly received or a non-acknowledgement (NACK) if an error was detected. The transmitter may subsequently transmit a new data packet related to other information bits, in case of an ACK, or retransmit the data packet received in error, in case of a NACK. The retransmission mechanism may be combined with forward error-correction coding (FEC), in which redundancy information is included in the data packet prior to transmission. This redundancy information can be used at the receiver for correcting at least some of the transmission errors, and retransmission of a data packet is only requested in case of uncorrectable errors. Such a combination of FEC and ARQ is referred to as hybrid automatic repeat request (HARQ). In a HARQ scheme the receiver may not simply discard a data packet with uncorrectable errors, but may combine obtained information with information from one or more retransmissions related to the same information bits. These retransmissions may contain identical copies of the first transmission. In more advanced schemes, such as incremental redundancy (IR) HARQ, the first transmission and related retransmissions are not identical. Rather, the various transmissions related to the same information bits may comprise different redundancy versions (RV), and each retransmission makes additional redundancy information available at the receiver for data detection. The number of transmissions related to the same information bits may be limited in a communication system by a maximum number of not successful transmissions, and a data packet related to new information bits may be transmitted once the maximum number of not successful transmissions has been reached. A scheduling grant may comprise a new data indicator (NDI) notifying a communication device whether the scheduled transmission is destined for a data packet related to new information bits. Further or alternatively, the scheduling grant may comprise an indication of the redundancy version (RV) used or to be used in the transmission. Each data packet, often referred to as transport block, may be transmitted in a communication system within a transmission time interval (TTI), such as a subframe in LTE. At least two transport blocks may be transmitted in parallel in a TTI when spatial multiplexing is employed. Processing of a transport block, its transmission and the processing and transmission of the corresponding HARQ-ACK feedback may take several TTIs. For example, in LTE-FDD such a complete HARQ loop takes eight subframes. Accordingly, eight HARQ processes are needed in a data stream in LTE-FDD for continuous transmission between an access node and a communication device. The HARQ processes are handled in the access nodes and the communication devices in parallel, and each HARQ process controls the transmission of transport blocks and ACK/NACK feedback related to a set of information bits in the data stream.

The following relates to UL HARQ. Specifically, it relates to scheduling schemes for UL data transmission in a TDD system.

In a conventional LTE-TDD system a communication device expects HARQ-ACK feedback transmission in DL to occur according to a predefined timing in relation to the subframe (TTI) in which a transport block was transmitted in UL on a physical uplink shared channel (PUSCH). Specifically, a communication device expects HARQ-ACK feedback for an UL data transmission in subframe n to be provided in subframe n+k_PHICH either on the physical hybrid ARQ indicator channel (PHICH) or by receiving a new UL grant on a physical downlink control channel (PDCCH) or enhanced physical downlink control channel (EPDCCH). HARQ-ACK feedback transmission on PHICH causes non-adaptive retransmission, that is, transmission on the same UL resource elements, while transmission on PDCCH allows for adaptive retransmission, that is, UL transmission according to new/adapted scheduling information. The HARQ-ACK delay k_PHICH depends in LTE-TDD on the selected UL/DL configuration as well as the subframe number n of the UL data transmission on PUSCH. Table 1 shows the association between UL/DL configurations, subframe number n and the corresponding HARQ-ACK delay k_PHICH as specified in 3GPP specification TS 36.213. The UL/DL configurations 0-6 in Table 2 specify the allocation of subframes to UL and DL in a radio frame and the positions of special subframes S in a radio frame which allow for a switching from one transmit direction to the other.

TABLE 1 k_PHICH for LTE-TDD

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

TABLE 2

Uplink-downlink configurations in LTE-TDD

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The minimum HARQ-ACK delay k_PHICH in Table 1 is four subframes and corresponds to the HARQ processing delay k_PROC. The HARQ processing delay k_PROC includes internal processing times of a communication device and transmission delays to and from the communication device (including also timing advance), and extends at the access node from the beginning of the subframe/TTI containing HARQ-ACK feedback to the beginning of the subframe/TTI in which the access node receives the corresponding UL transmission. Additional delays k_PHICH>k_PROC occur if the communication device has to wait for the next uplink subframe U for starting the transmission.

UL/DL configurations in LTE-TDD can be construed as communication opportunities with predetermined/predictable occurrence and length. As discussed above such a predetermined/predictable activity pattern cannot be ensured in a cell operating on unlicensed spectrum due to the uncoordinated access from different network operators and/or radio access networks. Therefore, it has been proposed to use an asynchronous transmission scheme for UL HARQ on unlicensed spectrum. In such a scheme UL retransmissions can be scheduled by UL grants and can occur without predetermined offsets in relation to the subframe of the initial transmission. However, even such an asynchronous transmission scheme has to consider the HARQ processing delay k_PROC between a detected HARQ-ACK feedback and the corresponding UL data transmission. This limits the ability of the scheme to adapt UL and DL transmissions in a communication in response to channel occupancy problems.

Therefore, there is a need to provide a signaling scheme for scheduling decisions which allows for dynamic adaption of UL and DL transmission sequences in a communication under consideration of HARQ processing requirements.

SUMMARY

In a first aspect, there is provided a method comprising receiving at a communication device in a wireless communication system related to one or more first data transmissions first assignment information indicative of attributes of the one or more first data transmissions, and comprising assignment information indicative of at least one contents attribute of at least one of the one or more first data transmissions. The method further comprising receiving subsequent to the reception of the first assignment information comprising the at least one contents attribute second assignment information comprising assignment information indicative of one or more time attributes of the one of the one or more first data transmissions, and causing transmission of the one of the one or more first data transmissions at a time according to the one or more time attributes.

The method may further comprise using the at least one contents attribute for at least partial processing of the one of the one or more first data transmissions prior to the reception of the second assignment information.

The method may further comprise storing of the at least partially processed one of the one or more first data transmissions and/or storing of the at least one contents attribute of the one of the one or more first data transmissions in a buffer, at least until reception of the second assignment information.

The time interval between the end of reception of the second assignment information and the start of transmission of the one of the one or more first data transmissions may be less than the time needed in the communication device for processing the one of the one or more first data transmissions according to the first assignment information.

The second assignment information may be transmitted from an access node of a cellular system in a first transmission time interval, and the one of the one or more first data transmissions may be transmitted to the access node such that the one of the one or more first data transmissions is available at the access node in a second transmission time interval, and wherein the time difference between the second transmission time interval and the first transmission time interval may be less than a minimum scheduling delay predetermined or preconfigured at least for communication between the access node and the communication device for the time difference between transmission of first assignment information comprising the at least one contents attribute from the access node and availability of a data transmission processed according to such first assignment information at the access node.

The first transmission time interval may be a first subframe and the second transmission time interval may be a second subframe according to an evolved universal terrestrial radio access network.

The method may further comprise receiving configuration information indicative of use or non-use of second assignment information related to one or more second data transmissions, receiving related to the one or more second data transmissions first assignment information indicative of attributes of the one or more second data transmissions, and comprising assignment information indicative of at least one contents attribute of one of the one or more second data transmissions, and further using the at least one contents attribute for at least partial processing of the one of the one or more second data transmissions, and further causing, if non-use of second assignment information related to the one or more second data transmissions is configured, transmission of the one of the one or more second data transmissions at a predetermined time in relation to the reception of the first assignment information related to the one or more second data transmissions.

The method may further comprise detecting suspend information related to at least the one of the one or more first data transmissions, and suspending the causing of transmission of at least the one of the one or more first data transmissions.

The suspend information may be detected based on information provided in the second assignment information, or based on the elapsed time since the reception of the first assignment information.

The method may further comprise receiving further assignment information related to at least the one of the one or more first data transmissions comprising assignment information indicative of at least one new or modified attribute of the one of the one or more first data transmission, and at least partial reprocessing of the at least partially processed one of the one or more first data transmissions according to the at least one new or modified attribute and/or completion of the processing of the one of the one or more first data transmissions according to the at least one new or modified attribute.

The second assignment information may comprise information indicative of the further assignment information.

The method may further comprise using a predetermined identifier for detection of second assignment information on a downlink control channel.

The downlink control channel may be a physical downlink control channel or an enhanced physical downlink control channel according to an evolved universal terrestrial access network.

The first assignment information may comprise information indicative of the predetermined identifier being associated with at least the communication device.

The predetermined identifier may be a radio network temporary identifier.

The method may further comprise detection of second assignment information based on at least one of:
  a detection reference signal,
  an initial signal,
  a preamble,
  an indicator channel in a transmission to the communication device comprising information indicative of the presence of second assignment information in the transmission or a subsequent transmission to the communication device.

The first assignment information may comprise information indicative of at least one of:
  the detection reference signal,
  the initial signal,
  the preamble, the indicator channel in a transmission to the communication device comprising information indicative of the presence of second assignment information in the transmission or a subsequent transmission to the communication device.

At least a part of the first assignment information may be received in an uplink grant message.

The causing of transmission of the one of the one or more first data transmissions may be performed according to a priority scheme, and one of the one or more time attributes may be indicative of at least one suitable transmission time interval.

The one of the one or more time attributes may be indicative of opportunities for data transmission from the communication device within a predetermined time window or within a predetermined time offset.

The one of the one or more time attributes may be indicative of at least one of an uplink-downlink configuration, downlink transmission burst configuration, uplink transmission burst configuration.

The second assignment information may be indicative of an offset attribute controlling a time offset or minimum time offset between the reception of the second assignment information and the causing of transmission of the one of the one or more first data transmissions.

The at least one contents attribute of the one of the one or more first data transmissions may be indicative of at least one of:
  selection information for payload selection,
  an identifier identifying a process in a hybrid automatic repeat request scheme,
  a new data indicator of a process in a hybrid automatic repeat request scheme,
  an indication of a redundancy version in a hybrid automatic repeat request scheme.

The first assignment information may be indicative of at least one of:
  a transport block length,
  a modulation and coding scheme,
  a demodulation reference signal,
  an aperiodic trigger for channel state information,
  a frequency hopping flag,
  a radio carrier,
  a power control command for uplink data transmission,
  a trigger for a sounding reference signal,
  a cyclic redundancy check,
  mapping information for mapping of a modulated and coded data transmission to resources of a physical channel,
  a time of validity of one or more information elements in the first assignment information.

The minimum scheduling delay may be a minimum delay between a hybrid automatic repeat request feedback and the corresponding data transmission.

The minimum delay between a hybrid automatic repeat request feedback and the corresponding data transmission may be four subframes according to an evolved universal terrestrial radio access network.

The wireless communication system may be an evolved universal terrestrial radio access network.

A transmission format indicative of attributes related to the transmission of second assignment information may be used on the downlink control channel for detecting the second assignment information at the communication device.

The transmission format may be a downlink control information according to an evolved universal terrestrial radio access network.

Signal transmission in the communication system may be subject to rules on execution of a clear channel assessment procedure.

In a second aspect, there is provided a method comprising causing in a wireless communication system related to one or more first data transmissions transmission of first assignment information indicative of attributes of the one or more first data transmissions, and comprising assignment information indicative of at least one contents attribute of at least one of the one or more first data transmissions, and causing subsequent to the transmission of the first assignment information comprising the at least one contents attribute transmission of second assignment information comprising assignment information indicative of one or more time attributes of the one of the one or more first data transmissions.

The method may further comprise receiving of the one of the one or more first data transmissions at a time according to the one or more time attributes The second assignment information may be transmitted from an access node of a cellular system in a first transmission time interval, and the one of the one or more first data transmissions may be available at the access node in a second transmission time interval, and the time difference between the second transmission time interval and the first transmission time interval may be less than a minimum scheduling delay predetermined or preconfigured at least for communication between the access node and a communication device for the time difference between transmission of first assignment information comprising the at least one contents attribute from the access node and availability of a data transmission processed according to such first assignment information at the access node.

The first transmission time interval may be a first subframe and the second transmission time interval may be a second subframe according to an evolved universal terrestrial radio access network.

The method may further comprise causing transmission of configuration information indicative of use or non-use of second assignment information related to one or more second data transmissions, and causing, related to the one or more second data transmissions, transmission of first assignment information indicative of attributes of the one or more second data transmissions, and comprising assignment information indicative of at least one contents attribute of one of the one or more second data transmissions. The method may further comprise using the at least one contents attribute for at least partial processing of the one of the one or more second data transmissions, and further receiving, if non-use of second assignment information related to the one or more second data transmissions is configured, the one of the one or more second data transmissions at a predetermined time in relation to the transmission of the first assignment information related to the one or more second data transmissions.

The method may further comprise causing transmission of suspend information related to at least the one of the one or more first data transmissions.

The second assignment information may comprise the suspend information.

The method may further comprise causing transmission of further assignment information related to at least the one of the one or more first data transmissions comprising assignment information indicative of at least one new or modified attribute of the one of the one or more first data transmission.

The second assignment information may comprise information indicative of the further assignment information.

The method may further comprise using a predetermined identifier for indication of second assignment information on a downlink control channel.

The downlink control channel may be a physical downlink control channel or an enhanced physical downlink control channel according to an evolved universal terrestrial access network.

The first assignment information may comprise information indicative of the predetermined identifier being associated with at least the communication device.

The predetermined identifier may be a radio network temporary identifier.

The method may further comprise providing an indication of second assignment information based on at least one of:
 a detection reference signal,
 an initial signal,
 a preamble,
 an indicator channel in a transmission to the communication device comprising information indicative of the presence of second assignment information in the transmission or a subsequent transmission to the communication device.

The first assignment information may comprises information indicative of at least one of:
 the detection reference signal,
 the initial signal,
 the preamble,
 the indicator channel in a transmission to the communication device comprising information indicative of the presence of second assignment information in the transmission or a subsequent transmission to the communication device.

At least a part of the first assignment information may be provided in an uplink grant message.

One of the one or more time attributes may be indicative of at least one suitable transmission time interval.

The one or more time attributes may be indicative of opportunities for data transmission from a communication device within a predetermined time window or within a predetermined time offset.

The one of the one or more time attributes may indicative of at least one of an uplink-downlink configuration, downlink transmission burst configuration, uplink transmission burst configuration.

The second assignment information may be indicative of an offset attribute controlling a time offset or minimum time offset between the causing of transmission of the second assignment information and the reception of the one of the one or more first data transmissions.

The at least one contents attribute of the one of the one or more first data transmission may be indicative of at least one of:
 selection information for payload selection,
 an identifier identifying a process in a hybrid automatic repeat request scheme,
 a new data indicator of a process in a hybrid automatic repeat request scheme,
 an indication of a redundancy version in a hybrid automatic repeat request scheme.

The first assignment information may be indicative of at least one of:
 a transport block length,
 a modulation and coding scheme,
 a demodulation reference signal,
 an aperiodic trigger for channel state information,
 a frequency hopping flag,
 a radio carrier,
 a power control command for uplink data transmission,
 a trigger for a sounding reference signal,
 a cyclic redundancy check,
 mapping information for mapping of a modulated and coded data transmission to resources of a physical channel,
 a time of validity of one or more information elements in the first assignment information.

The minimum scheduling delay may be a minimum delay between a hybrid automatic repeat request feedback and the corresponding data transmission.

The minimum delay between a hybrid automatic repeat request feedback and the corresponding data transmission may be four subframes according to an evolved universal terrestrial radio access network.

The wireless communication system may be an evolved universal terrestrial radio access network.

A transmission format indicative of attributes related to the transmission of second assignment information may be used on the downlink control channel for indicating the second assignment information.

The transmission format may be a downlink control information according to an evolved universal terrestrial radio access network.

Signal transmission in the communication system may be subject to rules on execution of a clear channel assessment procedure.

In a third aspect, there is provided an apparatus, said apparatus comprising at least one processor; and at least one memory including computer program code, the at least one memory and the computer program code configured, with the at least one processor, to cause the apparatus at least to receive at a communication device in a wireless communication system related to one or more first data transmissions first assignment information indicative of attributes of the one or more first data transmissions, and comprising assignment information indicative of at least one contents attribute of at least one of the one or more first data transmissions. The at least one memory and the computer program code further configured, with the at least one processor, to cause the apparatus at least to receive subsequent to the reception of the first assignment information comprising the at least one contents attribute second assignment information comprising assignment information indicative of one or more time attributes of the one of the one or more first data transmissions, and cause transmission of the one of the one or more first data transmissions at a time according to the one or more time attributes.

In a forth aspect, there is provided an apparatus, said apparatus comprising at least one processor; and at least one memory including computer program code, the at least one memory and the computer program code configured, with the at least one processor, to cause the apparatus at least to cause in a wireless communication system related to one or more first data transmissions transmission of first assignment information indicative of attributes of the one or more first data transmissions, and comprising assignment information indicative of at least one contents attribute of at least one of the one or more first data transmissions, and cause subsequent to the transmission of the first assignment information comprising the at least one contents attribute transmission of second assignment information comprising assignment information indicative of one or more time attributes of the one of the one or more first data transmissions.

In a fifth aspect, there is provided an apparatus comprising means for performing a method according to embodiments of the first aspect.

In a sixth aspect, there is provided an apparatus comprising means for performing a method according to embodiments of the second aspect.

In a seventh aspect, there is provided a computer program embodied on a non-transitory computer-readable storage medium, the computer program comprising program code for controlling a process to execute a process, the process comprising receiving at a communication device in a wireless communication system related to one or more first data transmissions first assignment information indicative of attributes of the one or more first data transmissions, and comprising assignment information indicative of at least one contents attribute of at least one of the one or more first data transmissions. The process further comprising receiving subsequent to the reception of the first assignment information comprising the at least one contents attribute second assignment information comprising assignment information indicative of one or more time attributes of the one of the one or more first data transmissions, and causing transmission of the one of the one or more first data transmissions at a time according to the one or more time attributes.

In an eighth aspect, there is provided a computer program embodied on a non-transitory computer-readable storage medium, the computer program comprising program code for controlling a process to execute a process, the process comprising causing in a wireless communication system related to one or more first data transmissions transmission of first assignment information indicative of attributes of the one or more first data transmissions, and comprising assignment information indicative of at least one contents attribute of at least one of the one or more first data transmissions, and causing subsequent to the transmission of the first assignment information comprising the at least one contents attribute transmission of second assignment information comprising assignment information indicative of one or more time attributes of the one of the one or more first data transmissions.

In a ninth aspect, there is provided a computer program product for a computer, comprising software code portions for performing the steps of a method according to embodiments of the first aspect.

In a tenth aspect, there is provided a computer program product for a computer, comprising software code portions for performing the steps of a method according to embodiments of the second aspect.

In an eleventh aspect, there is provided a mobile communication system comprising at least one apparatus according to the third aspect and at least one apparatus according to the forth aspect.

In a twelfth aspect, there is provided a mobile communication system comprising at least one apparatus according to the fifth aspect and at least one apparatus according to the sixth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
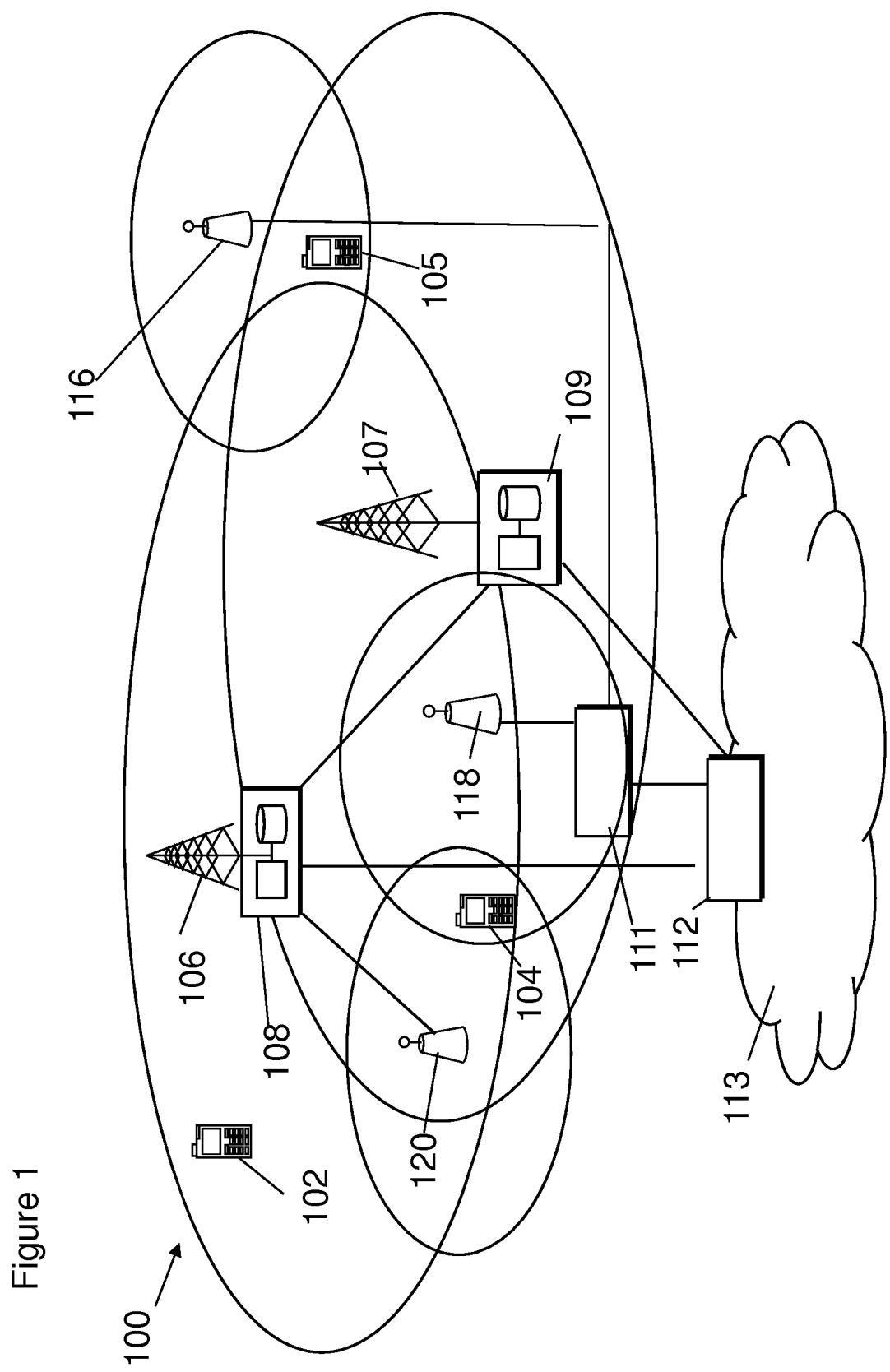
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
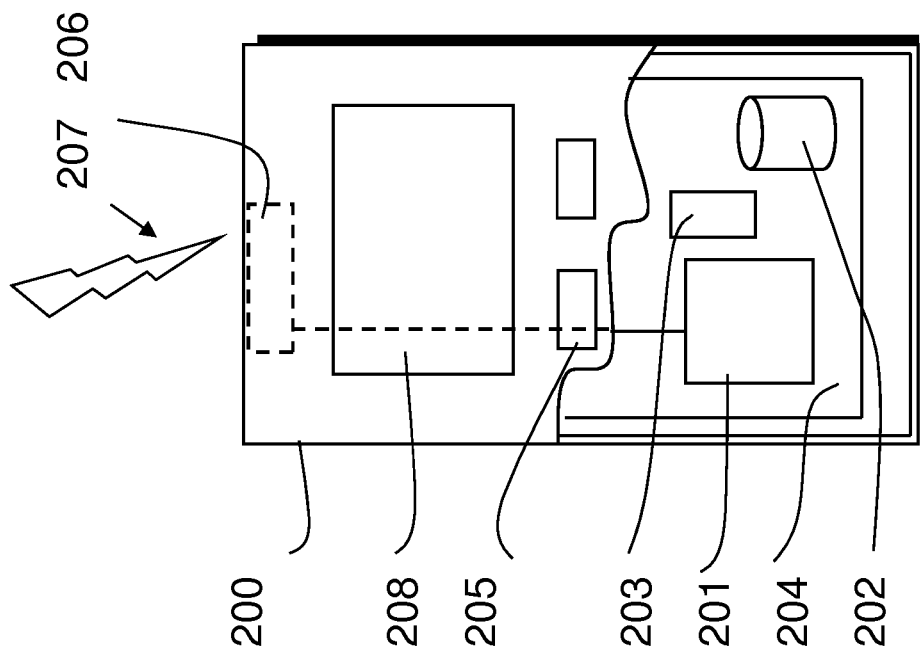
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on. Signaling mechanisms and procedures, which may enable a device to address in-device coexistence (IDC) issues caused by multiple transceivers, may be provided with help from the LTE network. The multiple transceivers may be configured for providing radio access to different radio technologies.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

As discussed above, there is a need to provide a signaling scheme for scheduling decisions which allows for dynamic adaption of UL and DL transmission sequences in a communication under consideration of HARQ processing requirements. In such a scheme a communication device may receive first assignment information, for example format attributes, related to one or more data transmissions. This first assignment information may be provided at least partly in at least one control message, in the following referred to as preparation grant, on a control channel, such as a physical downlink control channel (PDCCH) or an enhanced physical downlink control channel (EPDCCH) in LTE. The information conveyed through the preparation grant may be combined with other, for example more static, configuration information and system information. The preparation grant may in particular comprise an indication of contents attributes related to a data transmission, for example whether or not the data transmission is a HARQ retransmission. The preparation grant may further comprise format attributes, and/or mapping attributes and/or tentative time attributes. The communication device may use the contents attributes for at least partial processing of the data transmission according to the first assignment information, for example according to format attributes included in the first assignment information. The communication device may receive subsequent to the preparation grant second assignment information comprising an indication of time attributes related to the data transmission. Such a transmission of second assignment information is in the following referred to as confirmation grant. The communication device may process the data transmission according to the attributes indicated in the first and the second assignment information and may in particular transmit the data transmission according to time attributes of the confirmation grant. In other words, the preparation grant is not associated with final time attributes controlling when data are transmitted by the communication device. Rather, relevant or final information for controlling the time of transmission is only added in a subsequent confirmation grant, and at least partially processed or prepared data transmissions may be stored in the communication device until the transmission time as indicated in the confirmation grant is reached.

The beneficial effect of such a two-step signaling scheme of scheduling decisions may be seen in that it allows to shift out processing times in a communication from time windows of the communication opportunities to inactive phases, that is, phases in which neither uplink nor downlink transmission occurs in the communication. Such inactive phases may be inevitable in communications on unlicensed spectrum due to the uncoordinated access from different operators and the outcome of clear channel assessment procedures. In communications on licensed spectrum inactive phases may occur in accordingly configured operation modes, such as an enhanced DRX mode in LTE. Moreover, the two-step scheduling scheme may bring about additional flexibility for scheduling algorithms and may, for example, temporarily support uplink-downlink configurations with up to nine UL subframes in LTE-TDD. The two-step scheme may be combined in a cell with a conventional scheme with only one UL grant message. The two-step scheme may in such a cell be used for controlling communications in which delays due to the split of scheduling grants into two messages have only minor detrimental effect. The two-step scheme may further be used to reduce the needed processing time in the device after receiving the confirmation grant, as some preprocessing the data based on the initial grant is possible within the device.

Figure 3:
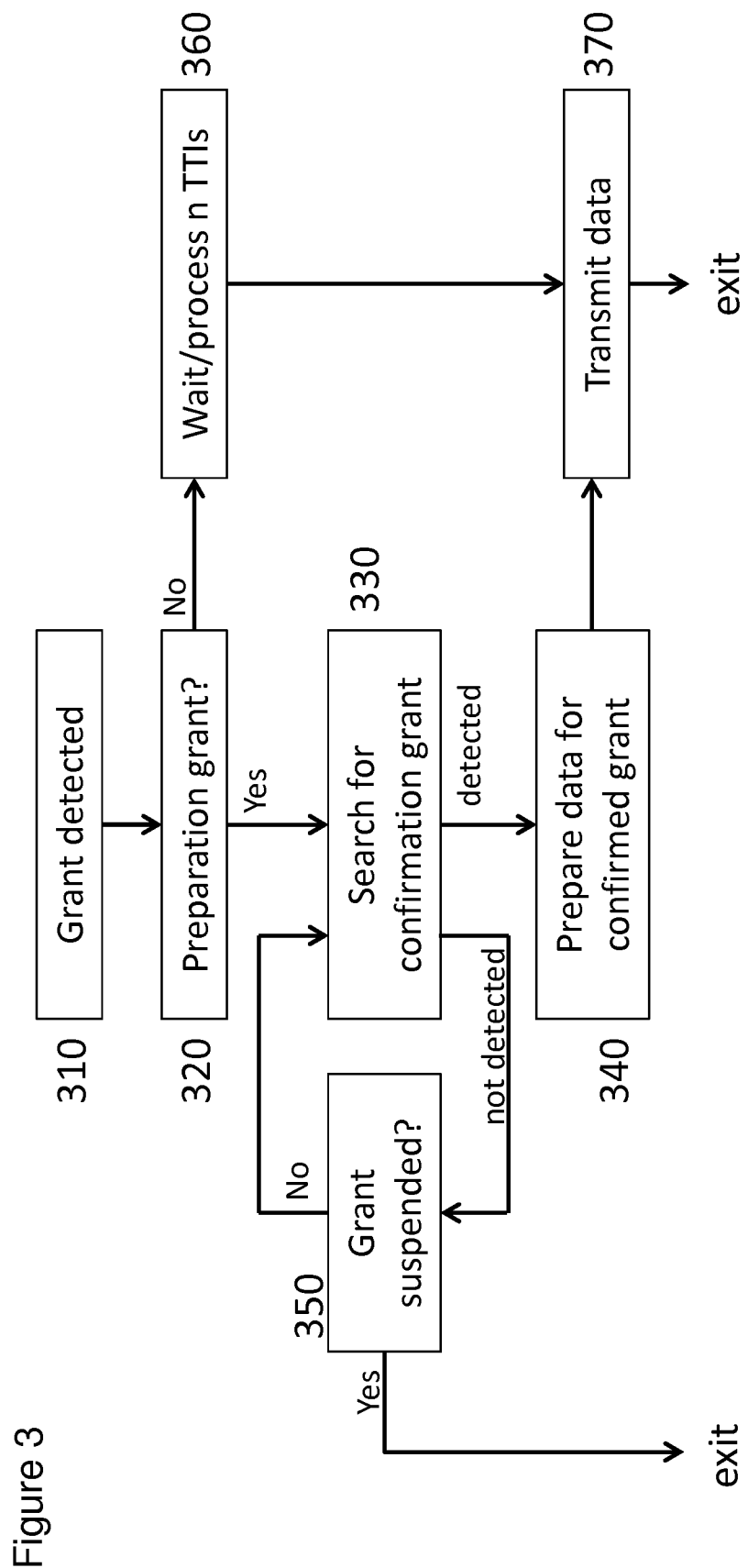
FIG. 3 shows an example method of a mobile communication device for two-step scheduling of uplink data transmissions.

FIG. 3 shows an example method of a mobile communication device for two-step scheduling of uplink data transmissions.

At step 310, the communication device detects an UL grant. The UL grant may be received on a downlink control channel, such as the physical downlink control channel (PDCCH) or the enhanced physical downlink control channel EPDCCH in LTE. The UL grant message may comprise one or more contents attributes specifying the information or data to be transmitted. The contents attributes may, for example, comprise an indication of the related HARQ process and/or the redundancy version and/or a new data indicator. The UL grant message may be provided from an access node in downlink control information similar to DCI formats 0 or 4 in LTE, and may but need not include mapping attributes or resource allocation information.

At step 320, the communication device may determine whether the UL grant message relates to a two-step signaling scheme or to a conventional signaling scheme. In case of a conventional UL grant message the method proceeds to step 360, and the communication device processes the data according to the UL grant and transmits the data in step 370 after a predetermined time offset, for example n TTIs, in relation to the detected UL grant. In case the UL grant was a preparation grant of a two-step signaling scheme, the method proceeds to step 330.

At step 330, the communication device searches for a confirmation grant corresponding to the preparation grant. The confirmation grant may be provided from an access node on a downlink control channel, such as the physical downlink control channel (PDCCH) or the enhanced physical downlink control channel (EPDCCH) in LTE. The confirmation grant may be provided from the access node in downlink control information similar to DCI formats 3 or 3A in LTE for single-bit or two-bit UL transmit power adjustments, that is, short and dedicated messages without format attributes and mapping attributes. The message conveyed through the confirmation grant may specify a condition for triggering the related data transmission. The trigger condition may indicate a suitable TTI, for example by specifying a time offset from the detection of the confirmation grant. The confirmation grant may comprise an identifier identifying the communication device or the group of communication devices the confirmation grant is directed to. A specific radio network temporary identifier (RNTI) may be specified for detection of the confirmation grant on the downlink control channel. This specific RNTI may be a group identifier associated with a group of communication devices. The presence of a message being directed to this RNTI on a control channel may as such notify a communication device or group of communication devices of the confirmation grant. The message in the confirmation grant may comprise further group identifiers and/or trigger conditions. The confirmation grant may comprise information indicative of confirmed attributes provided in the preparation grant. The confirmation grant may in some cases be a duplicate of the preparation grant. In other cases the confirmation grant may comprise one or more modified and/or new attributes. The communication device may start at step 330 at least partial processing of a data transmission using at least contents attributes from the preparation grant. If the confirmation grant is not detected the method proceeds to step 350.

At step 350, the communication device determines whether the UL grant detected in step 310 (and the related preparation grant of step 320) has been suspended or is to be suspended. The preparation grant may be suspended upon expiry of a respective timer. The timer may have been started at step 310 or step 320. Alternatively, the access node may provide explicit suspend information. If the grant has been suspended the method exits and prepared or processed data related to the grant may be removed from internal buffers. The method returns to step 330 unless the grant has been suspended.

If the confirmation grant corresponding to the preparation grant of step 320 has been detected at step 330, the method proceeds to step 340. At step 340 the communication device prepares the data for transmission based on information provided in the confirmation grant. The communication may in particular complete the processing of partially processed data transmissions. The processing may be completed according to a trigger condition specified in the confirmation grant. The processing may be completed based on control information/attributes provided in the preparation grant. The processing at step 340 may include new or additional parameters, for example mapping attributes/parameters provided or updated in the confirmation grant. The method proceeds to step 370, and the communication device transmits the processed data.

At least partially processed data according to steps 330 and 340 related to different subsequently detected UL grants may be stored in a buffer of the communication device until transmission of the related data at subsequent steps 370. The size of this buffer may be determined in an embodiment based on the scheduling delay of n TTIs between a detected UL grant at step 310 and the corresponding data transmission at step 370 for the conventional signaling scheme.

The time differences of k TTIs between a detected confirmation grant at step 330 and a corresponding data transmission at step 370 may be less than predetermined time intervals specified in dependence of contents attributes provided in the preparation grant. In an embodiment shorter time intervals may be specified for retransmissions than for new data transmissions in a HARQ scheme. In general, the needed processing and preparation time of k TTIs might be shorter compared to traditional UL grants (i.e. k<n) as the device is able to perform some data processing based on the preparation grant already and will only need to complete the processing based on the confirmation grant.

A two-step signaling scheme for UL scheduling decisions may be used in a cell of a cellular communication system in parallel with a conventional signaling scheme. The two-step signaling scheme may preferably be used for data transmissions at the beginning of an UL transmission opportunity until data transmissions for the conventional signaling scheme get available.

Preparation grants may be suspended, for example when the therein provided scheduling attributes are outdated. A respective suspend command may not affect only an individual data transmission but data transmissions related to subsequently detected uplink grants and related preparation grants. The access node may use confirmation grants to notify a communication device of suspended preparation grants. In an embodiment the access node may notify the communication device of a suspended preparation grant by scheduling the respective data transmission for a not suitable TTI, for example a TTI configured for DL data transmission or a TTI outside of communication opportunities between the communication device and the access node. In another embodiment, the suspend command may be generated internally in the communication device based on a time elapsed from the reception of the preparation grant. The configuration of the duration until the generation of such an automatic suspend comment could be part of the configuration of the radio resource control (RRC) configuration for the communication device.

Preparation grants may be modified or supplemented, for example when updated or new scheduling attributes get available. A respective update command may not affect only an individual data transmission but data transmissions related to subsequently detected uplink grants and related preparation grants. The access node may use confirmation grants to notify a communication device of modified or supplemented preparation grants. The communication device may use information from update commands to reprocess data for transmissions and/or to complete data processing for transmissions. Update commands may in particular include modified or new supplemental mapping information or resource allocation information.

In an embodiment a specific radio network temporary identifier (RNTI) may be used on a downlink control channel to notify communication devices in a cell of the transmission of a confirmation grant. The notification on the downlink control channel may be based on a new or dedicated transmission format, such as a new DCI format for confirmation grants in LTE. An indicator channel in a transmission or TTI, such as the physical control format indicator channel (PCFICH) in LTE, may comprise information indicative of the presence of a confirmation grant in the current or a subsequent transmission or TTI. The confirmation grant may be directed to all communication devices in a cell, a group of communication devices or only an individual communication device. Alternatively or additionally, the access node may use specific downlink signals to notify communication devices or a group of communication devices in a cell of the transmission of a confirmation grant. The notification may be conveyed through a preamble or any other initial signal in the respective TTI, or through reference signals, such as enhanced discovery reference signals (DRS). The signals may comprise portions carrying respective information. The communication devices may be configured to detect this information blindly. The communication devices may use in the detection procedure information provided in the corresponding preparation grant.

Data transmissions in the two-step scheduling scheme may be performed according to a priority scheme. Such a scheme may in particular consider the time when the UL grant corresponding to a prepared data transmission was detected at step 310. A priority scheme may in particular be used if a confirmation grant is not provided by explicit signaling but by implicit signaling. Implicit signaling of confirmation grants may in particular be used for supporting uplink-heavy uplink-downlink configurations in communication opportunities, where a downlink transmission in at least one TTI needs to carry confirmation grants for several uplink data transmissions.

In an embodiment the time attributes/parameters provided in the confirmation grant may not specify absolute time values or intervals, but may only relate to TTIs suitable for data transmission at a step 370. For example, a confirmation grant may in such an embodiment include a time offset of 1 to denote a data transmission at the next suitable TTI in the current or subsequent UL transmission opportunity. An access node may in such an embodiment notify a communication device of suitable TTIs by providing the communication device with uplink-downlink configuration information of a time window, such as a current and/or upcoming communication opportunity. A priority scheme may be applied for selecting data transmissions in such an embodiment, so as to ensure that data packets are transmitted in a predetermined order.

Figure 4:
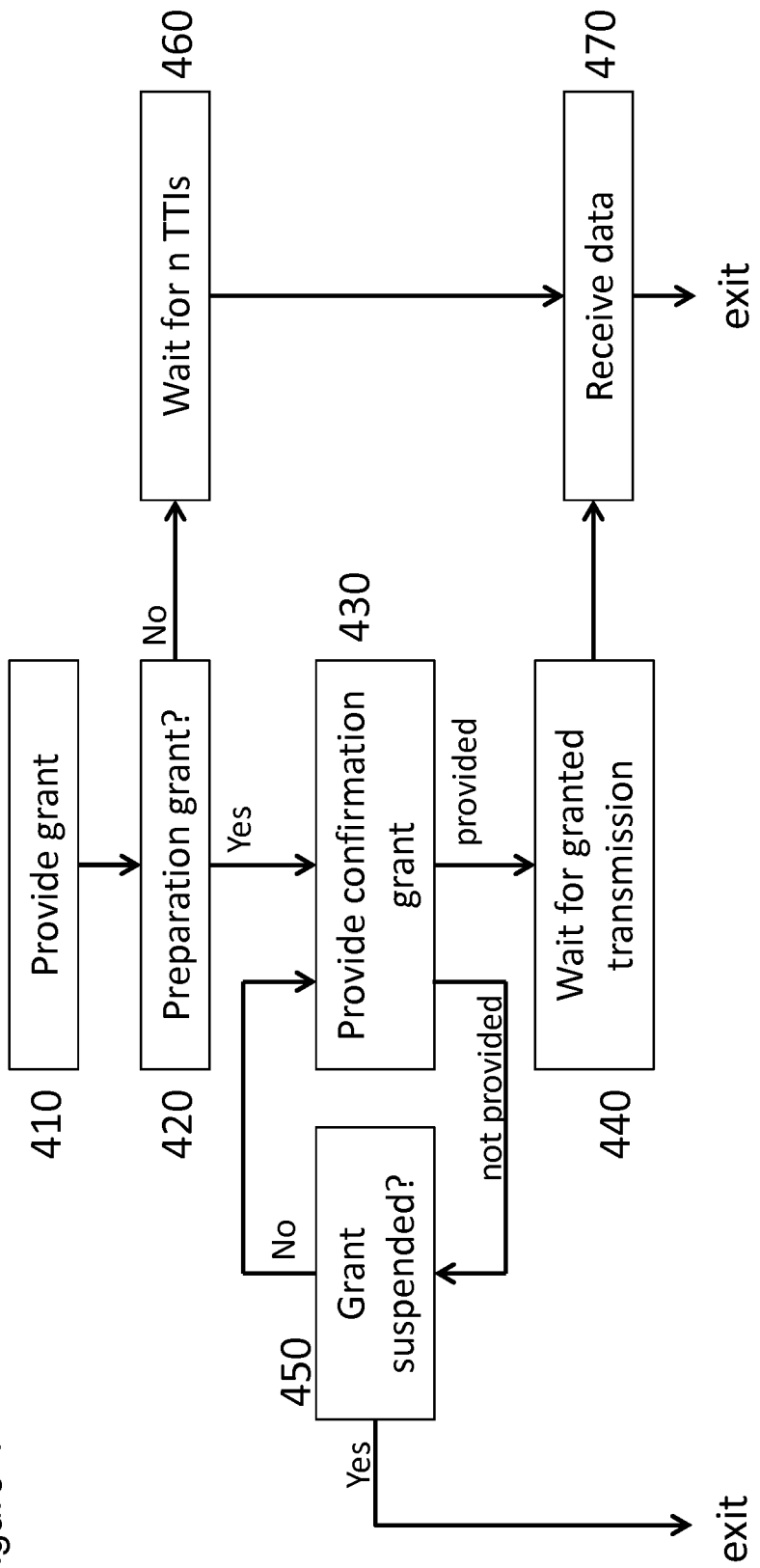
FIG. 4 shows an example method of an access node for two-step scheduling of uplink data transmissions.

FIG. 4 shows an example method of an access node for two-step scheduling of uplink data transmissions.

At step 410, the access node, for example an eNB, provides a communication device with an UL grant. The UL grant may be transmitted on a downlink control channel, such as the physical downlink control channel (PDCCH) or the enhanced physical downlink control channel (EPDCCH) in LTE. The UL grant message may comprise one or more contents attributes specifying the information or data to be transmitted. The contents attributes may, for example, comprise an indication of the related HARQ process and/or the redundancy version and/or a new data indicator. The UL grant message may be provided from the access node in downlink control information similar to DCI formats 0 or 4 in LTE, and may but need not include mapping attributes or resource allocation information.

At step 420, the access node may determine whether the UL grant message relates to a two-step signaling scheme or to a conventional signaling scheme. In case of a conventional UL grant message the method proceeds to step 460, and the access node waits for the communication device to process the data according to the UL grant and expects the transmitted data in step 470 after a predetermined time offset, for example n TTIs, in relation to the transmitted UL grant. In case the UL grant was a preparation grant of a two-step signaling scheme, the method proceeds to step 430.

At step 430, the access node schedules the confirmation grant corresponding to the preparation grant. The access node may transmit the confirmation grant on a downlink control channel, such as the physical downlink control channel (PDCCH) or the enhanced physical downlink control channel (EPDCCH) in LTE. The confirmation grant may be provided from the access node in downlink control information similar to DCI formats 3 or 3A in LTE for single-bit or two-bit UL transmit power adjustments, that is, short and dedicated messages without format attributes and mapping attributes. The message conveyed through the confirmation grant may specify a condition for triggering the related data transmission. The trigger condition may indicate a suitable TTI, for example by specifying a time offset from the detection of the confirmation grant by the communication device. The confirmation grant may comprise an identifier identifying the communication device or the group of communication devices the confirmation grant is directed to. A specific radio network temporary identifier (RNTI) may be specified for detection of the confirmation grant on the downlink control channel. This specific RNTI may be a group identifier associated with a group of communication devices. The presence of a message being directed to this RNTI on a control channel may as such notify the communication device or a group of communication devices of the confirmation grant. The message in the confirmation grant may comprise further group identifiers and/or trigger conditions. If the confirmation grant is not provided at step 430 the method proceeds to step 450.

At step 450, the access nodes determines whether the UL grant provided in step 410 (and the related preparation grant of step 420) has been suspended or is to be suspended. The preparation grant may be suspended upon expiry of a respective timer. The timer may have been started at step 410 or step 420. Alternatively, the access node may provide the communication device with explicit suspend information. If the grant has been suspended the method exits, and information related to the UL grant may be removed from internal buffers. The method returns to step 430 unless the grant has been suspended.

If the confirmation grant corresponding to the preparation grant of step 420 has been provided at step 430, the method proceeds to step 440. At step 440 the access node waits for k TTIs for the communication device to prepare and transmit according to the granted transmission. The method proceeds to step 470, and the access node receives the data from the communication device according to the confirmation grant.

Figure 5:
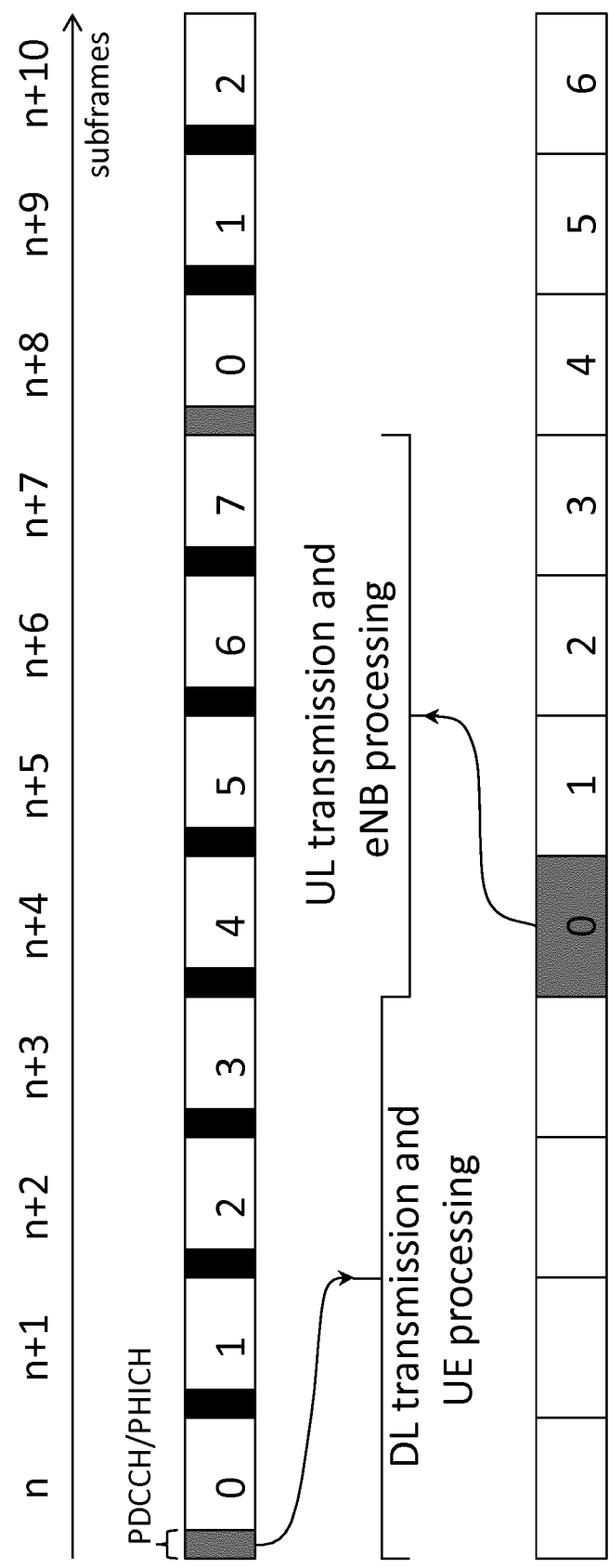
FIG. 5 shows a schematic diagram illustrating conventional scheduling of uplink data transmissions in a communication system.

FIG. 5 shows a schematic diagram illustrating a conventional signaling scheme for UL scheduling in a LTE-FDD system. PUSCH scheduling or HARQ-ACK feedback related to HARQ process 0 is provided in subframe n on PDCCH or PHICH. A scheduling or an HARQ-ACK delay of four subframes is stipulated in LTE-FDD, which allows for scheduling information or HARQ-ACK feedback transmission and the required processing of respective (re)transmissions at the communication device. The processing at the communication device may include the following steps:

Channel estimation for the downlink control channel (PDCCH or EPDCCH),
blind decoding of the downlink control channel for detecting an UL scheduling grant,
extracting relevant parameters from the UL scheduling grant,
selecting the payload data from queues related to different services,
assembly of a data unit for transmission,
scrambling and forward error correction coding,
modulation mapping,
mapping to physical channel resources.

Transmission or retransmission of the next transport block related to HARQ process 0 occurs in FIG. 5 after expiry of the scheduling or HARQ-ACK delay in subframe n+4. Accordingly, (re)transmission of transport blocks in response to scheduling or HARQ-ACK feedback provided in subframes n+1 to n+4 occurs in respective subframes of a time window extending from subframe n+5 to subframe n+8. However, subframes n+1, n+2 and n+3 at the beginning of the shown transmission sequence cannot be used in the conventional signaling scheme for UL data transmissions.

Figure 6:
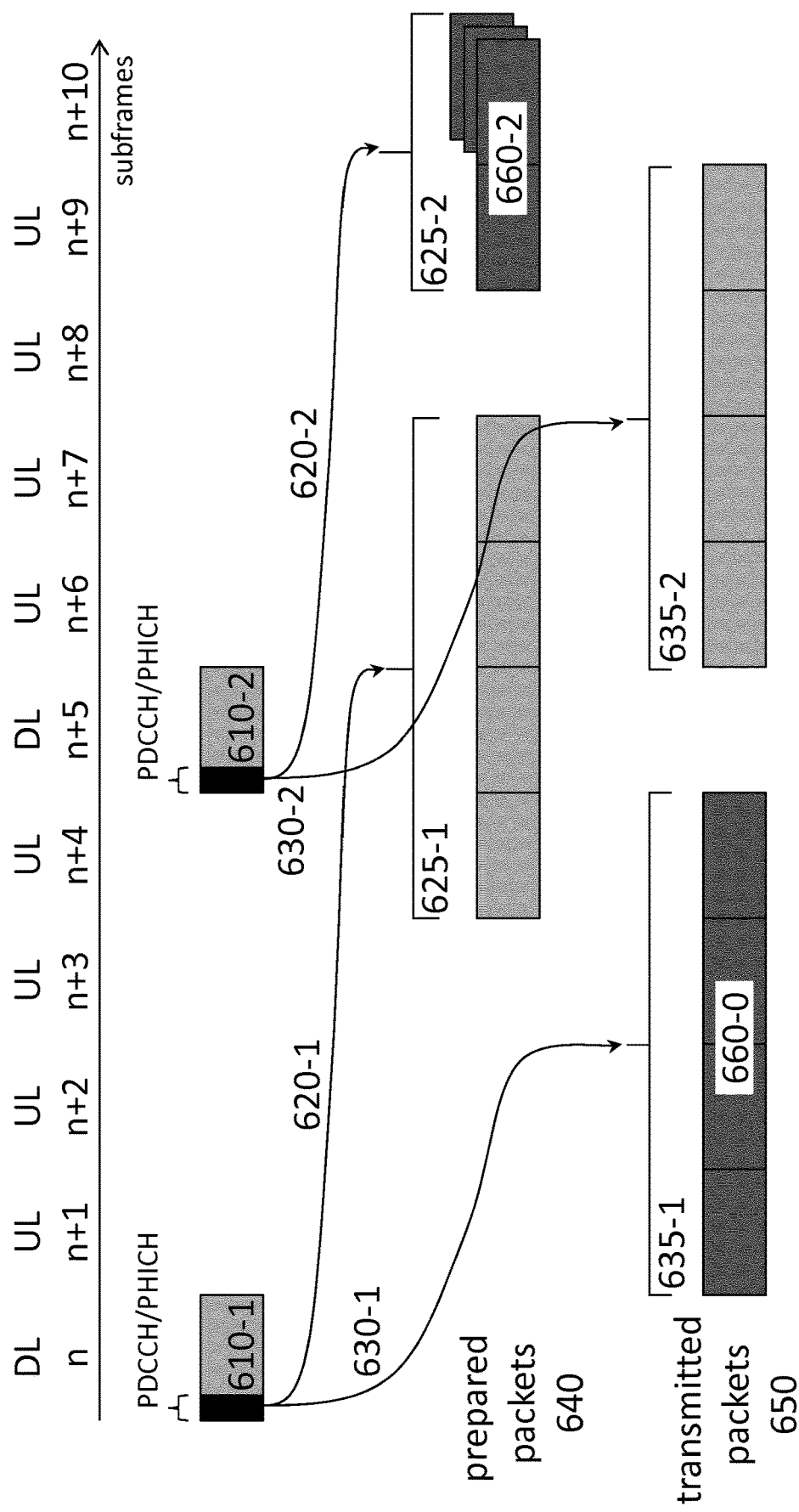
FIG. 6 shows a schematic diagram illustrating scheduling of uplink data transmissions in a communication system employing a two-step scheduling mechanism.

FIG. 6 shows a schematic diagram illustrating a two-step signaling scheme according to some embodiments. Specifically, FIG. 6 shows an example communication opportunity for communication between an access node and a communication device. The communication opportunity contains DL transmission opportunities in subframes n and n+5, and a UL transmission opportunities in subframes n+1, n+2, n+3, n+4 and n+6, n+7, n+8, n+9.

The DL control information 610-1 in subframe n may include a first preparation grant 620-1 on a downlink control channel, such as the PDCCH or EPDCCH in LTE. Preparation grant 620-1 may contain all the scheduling information typically provided in a conventional uplink scheduling grant for UL data transmissions, such as the modulation and coding scheme of the transmission, an indication of the demodulation reference signal to use in the transmission, physical resource allocation or mapping information of the transmission, and information related to the respective HARQ process. However, the preparation grant may not provide time attributes controlling the time of transmission, in contrast to a conventional uplink scheduling grant. Rather, the time of transmission may be provided subsequent to the preparation grant by explicit or implicit signalling in a corresponding confirmation grant. In an alternative embodiment the preparation grant may provide tentative time attributes specifying a time of transmission. However, these time attributes may need to be confirmed subsequently by a corresponding confirmation grant, and a communication device may only transmit UL data in a certain subframe, if the validity of a respective time attribute has been confirmed in the confirmation grant.

Preparation grant 620-1 controls the processing of the sequence of data packets 625-1 in the stream of prepared packets 640. For controlling the processing of a sequence of data packets, preparation grant 620-1 may comprise an indication of a time of validity regarding one or more information elements provided by the preparation grant, so as to indicate which packets in 625-1 are affected/controlled by which information elements.

The confirmation grant 630-1 may correspond to a previous preparation grant 620-0 (not shown in FIG. 6) provided from the access node in the preceding communication opportunity. The confirmation grant 630-1 may be provided by means of explicit signalling on a downlink control channel, such as the PDCCH or EPDCCH in LTE. Preparation grant 620-1 and confirmation grant 630-1 may be provided in separate messages on the downlink control channel or in a single message. In the latter case, preparation grant 620-1 and confirmation grant 630-1 may be encoded commonly, and uplink data transmission in subframe n+1 in response to confirmation grant 630-1 may therefore acknowledge successful detection of both the confirmation grant 630-1 and the preparation grant 620-1 provided in subframe n. Confirmation grant 630-1 may cause the transmission of the dark grey data packets 660-0 within transmission window 635-1 which may extend from subframe n+1 to subframe n+4. The dark grey data packets 660-0 in the stream of transmitted packets 650 are read from a buffer and have been processed/prepared by the communication device based on said preparation grant 620-0 (not shown in FIG. 6). The availability of prepared data in a buffer allows the communication device to respond in subframe n+1 to confirmation grant 630-1 provided in subframe n without having to wait for the complete processing time of a data packet.

The detection of confirmation grants on the downlink control channel may be accelerated, for example, by linking confirmation grants to certain location attributes, for example, regions in which confirmation grants may be located, and their start and size in the search space of the downlink control channel. These attributes may specify a new or dedicated transmission format on the downlink control channel, such as a new DCI format for confirmation grants in LTE.

Alternatively, confirmation grant 630-1 may be provided by means of implicit signalling. Specifically, received or detected information indicating availability of UL subframes n+1, n+2, n+3, and n+4 may function as confirmation grant 630-1 for the transmission of data packets 660-0 in transmission window 635-1.

Preparation grant 620-1 may cause the processing/preparation of the four light grey data packets in the preparation window 625-1. These data packets get available for transmission in subframes n+4, n+5, n+6 and n+7, that is, the first of these data packets may already be available when the last of the data packets 660-0 related to said previous (not shown) preparation grant 620-0 is transmitted. This sequence of transmissions may reflect a priority scheme in which data packets 660-0 related to the previous preparation grant 620-0 are prioritized over data packets related to the latest preparation grant 620-1.

Preparation grant 620-1 may provide time attributes for controlling the time of transmission of the data packets in preparation window 625-1. The access node may confirm these time attributes in subframe n+5 by the corresponding confirmation grant 630-2 in DL control information 610-2. After detecting confirmation grant 630-2, the communication device may transmit the prepared data packets in the transmission window 635-2, which may extend from subframe n+6 to n+9.

The access node may perform a clear channel assessment procedure, such as LBT, prior to each DL transmission burst. The communication device may also perform a clear channel assessment procedure, for example at least a short LBT procedure, for following UL transmission bursts. Clear channel access procedures at the communication device may likely succeed because the communication device needs to perform only a single check. The single check may occur right after the downlink transmission is terminated, whereby there is a low probability that other devices will be able to occupy the channel. In the example of FIG. 6 the access node may perform a successful clear channel assessment procedure and may re-acquire the channel for DL data transmission in subframe n+5. The access node may send confirmation grant 630-2 related to preparation grant 620-1 in subframe n+5. Confirmation grant 630-2 may be signalled implicitly by allocating at least subframe n+6 to one or more communication devices. After sending confirmation grant 630-2 related to preparation grant 620-1 the access node may await corresponding UL data transmissions in transmission window 635-2. Having received confirmation grant 630-2 related to preparation grant 620-1 and preparation window 625-1, the communication device in FIG. 6 may try to acquire the channel for transmission of the prepared data packets in transmission window 635-2.

DL control information 610-2 in subframe n+5 may include a preparation grant 620-2 in addition to the confirmation grant 630-2. The first of the data packets related to preparation grant 620-2 may get available in preparation window 625-1 in subframe n+9, but the effect of preparation grant 620-2 may extend beyond the time window of the communication opportunity, so as to refill the buffer in the communication device with prepared data packets for a communication opportunity following later on. This is indicated by the three dark grey data packets in subframe n+10. But it should be understood that the three data packets need not be processed within only one subframe.

It should be understood that each block of the flowchart of the Figures and any combination thereof may be implemented by various means or their combinations, such as hardware, software, firmware, one or more processors and/or circuitry.

Figure 7:
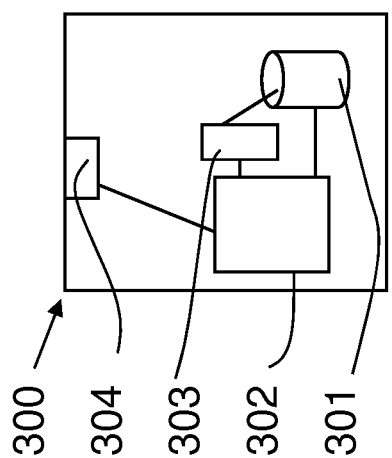
FIG. 7 shows a schematic diagram of an example control apparatus.

The method may be implemented on a mobile device as described with respect to FIG. 2 or control apparatus as shown in FIG. 7. FIG. 7 shows an example of a control apparatus for a communication system, for example to be coupled to and/or for controlling a station of an access system, such as a RAN node, e.g. a base station, (e) node B or 5G AP, a central unit of a cloud architecture or a node of a core network such as an MME or S-GW, a scheduling entity, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may comprise providing two-step signaling schemes for signaling of scheduling decisions.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE networks, similar principles may be applied in relation to other networks and communication systems, for example, 5G networks. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
   receiving at a communication device in a wireless communication system related to one or more first data transmissions first assignment information indicative of attributes of the one or more first data transmissions, and comprising assignment information indicative of at least one contents attribute of at least one of the one or more first data transmissions;
   receiving, subsequent to the reception of the first assignment information comprising the at least one contents attribute, second assignment information comprising assignment information indicative of one or more time attributes of the one of the one or more first data transmissions; and
   causing transmission of the one of the one or more first data transmissions at a time according to the one or more time attributes,
   wherein the second assignment information is indicative of an offset attribute controlling a time offset or minimum time offset between the reception of the second assignment information and the causing of transmission of the one of the one or more first data transmissions.

2. A method according to claim 1, wherein the time interval between the end of reception of the second assignment information and the start of transmission of the one of the one or more first data transmissions is less than the time needed in the communication device for processing the one of the one or more first data transmissions according to the first assignment information.

3. A method according to claim 1,
   wherein the second assignment information is transmitted from an access node of a cellular system in a first transmission time interval, and
   the one of the one or more first data transmissions is transmitted to the access node such that the one of the one or more first data transmissions is available at the access node in a second transmission time interval; and
   wherein the time difference between the second transmission time interval and the first transmission time interval is less than a minimum scheduling delay, and wherein the minimum scheduling delay is predetermined or preconfigured at least for communication between the access node and the communication information, comprising the at least one contents attribute from the access node, and availability of a data transmission processed according to such first assignment information at the access node.

4. A method according to claim 1, comprising:
   receiving configuration information indicative of use or non-use of second assignment information related to one or more second data transmissions;
   receiving, related to the one or more second data transmissions, first assignment information indicative of attributes of the one or more second data transmissions, and comprising assignment information indicative of at least one contents attribute of one of the one or more second data transmissions;

using the at least one contents attribute for at least partial processing of the one of the one or more second data transmissions; and causing, in response to non-use of second assignment information related to the one or more second data transmissions being configured, transmission of the one of the one or more second data transmissions at a predetermined time in relation to the reception of the first assignment information related to the one or more second data transmissions.

5. A method according to claim 1, comprising
detecting suspend information related to at least the one of the one or more first data transmissions; and
suspending the causing of transmission of at least the one of the one or more first data transmissions.

6. A method according to claim 5, wherein the suspend information is detected based on information provided in the second assignment information, or based on the elapsed time since the reception of the first assignment information.

7. A method according to claim 1, comprising using a predetermined identifier for detection of second assignment information on a downlink control channel.

8. A computer program product for a computer, comprising a non-transitory computer-readable medium comprising software code portions for performing the steps of claim 1 when said software code portions are run on the computer.

9. A method according to claim 1, wherein the at least one contents attribute is indicative of at least one of:
selection information for payload selection,
an identifier identifying a process in a hybrid automatic repeat request scheme,
a new data indicator of a process in a hybrid automatic repeat request scheme, or
an indication of a redundancy version of a hybrid automatic repeat request scheme.

10. A method comprising:
causing, in a wireless communication system related to one or more first data transmissions, transmission of first assignment information indicative of attributes of the one or more first data transmissions, and comprising assignment information indicative of at least one contents attribute of at least one of the one or more first data transmissions;
causing, subsequent to the transmission of the first assignment information comprising the at least one contents attribute, transmission of second assignment information comprising assignment information indicative of one or more time attributes of the one of the one or more first data transmissions,
wherein the second assignment information is indicative of an offset attribute controlling a time offset or minimum time offset between the reception of the second assignment information and the causing of transmission of the one of the one or more first data transmissions.

11. A method according to claim 10,
wherein the second assignment information is transmitted from an access node of a cellular system in a first transmission time interval, and
the one of the one or more first data transmissions is available at the access node in a second transmission time interval; and
wherein the time difference between the second transmission time interval and the first transmission time interval is less than a minimum scheduling delay, and wherein the minimum scheduling delay is predetermined or preconfigured at least for communication between the access node and a communication device for the time difference between transmission of first assignment information, comprising the at least one contents attribute from the access node, and availability of a data transmission processed according to such first assignment information at the access node.

12. A method according to claim 10, comprising:
causing transmission of configuration information indicative of use or non-use of second assignment information related to one or more second data transmissions;
causing, related to the one or more second data transmissions, transmission of first assignment information indicative of attributes of the one or more second data transmissions, and comprising assignment information indicative of at least one contents attribute of one of the one or more second data transmissions;
using the at least one contents attribute for at least partial processing of the one of the one or more second data transmissions; and
receiving, in response to non-use of second assignment information related to the one or more second data transmissions being configured, the one of the one or more second data transmissions at a predetermined time in relation to the transmission of the first assignment information related to the one or more second data transmissions.

13. A method according to claim 10, comprising causing transmission of suspend information related to at least the one of the one or more first data transmissions.

14. A method according to claim 13, wherein the second assignment information comprises the suspend information.

15. A method according to claim 10, comprising causing transmission of further assignment information related to at least the one of the one or more first data transmissions comprising assignment information indicative of at least one new or modified attribute of the one of the one or more first data transmission.

16. A method according to claim 10, comprising using a predetermined identifier for indication of second assignment information on a downlink control channel.

17. A computer program product for a computer, comprising a non-transitory computer-readable medium comprising software code portions for performing the steps of claim 10 when said software code portions are run on the computer.

18. A method according to claim 10, wherein the at least one contents attribute is indicative of at least one of:
selection information for payload selection,
an identifier identifying a process in a hybrid automatic repeat request scheme,
a new data indicator of a process in a hybrid automatic repeat request scheme, or
an indication of a redundancy version of a hybrid automatic repeat request scheme.

19. An apparatus comprising:
at least one processor; and
at least one memory including computer program code, the at least one memory and the computer program code configured, with the at least one processor, to cause the apparatus to perform at least the following:
receive, at a communication device in a wireless communication system related to one or more first data transmissions, first assignment information indicative of attributes of the one or more first data transmissions, and comprising assignment information indicative of at least one contents attribute of at least one of the one or more first data transmissions;

receive, subsequent to the reception of the first assignment information comprising the at least one contents attribute, second assignment information comprising assignment information indicative of one or more time attributes of the one of the one or more first data transmissions; and cause transmission of the one of the one or more first data transmissions at a time according to the one or more time attributes, wherein the second assignment information is indicative of an offset attribute controlling a time offset or minimum time offset between the reception of the second assignment information and the causing of transmission of the one of the one or more first data transmissions.

20. An apparatus according to claim 19, wherein the at least one contents attribute is indicative of at least one of:
   selection information for payload selection,
   an identifier identifying a process in a hybrid automatic repeat request scheme,
   a new data indicator of a process in a hybrid automatic repeat request scheme, or
   an indication of a redundancy version of a hybrid automatic repeat request scheme.

21. An apparatus according to claim 19, wherein the time interval between the end of reception of the second assignment information and the start of transmission of the one of the one or more first data transmissions is less than the time needed in the communication device for processing the one of the one or more first data transmissions according to the first assignment information.

22. An apparatus according to claim 19,
   wherein the second assignment information is transmitted from an access node of a cellular system in a first transmission time interval, and
   the one of the one or more first data transmissions is transmitted to the access node such that the one of the one or more first data transmissions is available at the access node in a second transmission time interval; and
   wherein the time difference between the second transmission time interval and the first transmission time interval is less than a minimum scheduling delay, and wherein the minimum scheduling delay is predetermined or preconfigured at least for communication between the access node and the communication device for the time difference between transmission of first assignment information, comprising the at least one contents attribute from the access node, and availability of a data transmission processed according to such first assignment information at the access node.

23. An apparatus according to claim 19, and the at least one memory and the computer program code further configured, with the at least one processor, to cause the apparatus to:
   receive configuration information indicative of use or non-use of second assignment information related to one or more second data transmissions;
   receive, related to the one or more second data transmissions, first assignment information indicative of attributes of the one or more second data transmissions, and comprising assignment information indicative of at least one contents attribute of one of the one or more second data transmissions;
   use the at least one contents attribute for at least partial processing of the one of the one or more second data transmissions; and
   cause, in response to non-use of second assignment information related to the one or more second data transmissions being configured, transmission of the one of the one or more second data transmissions at a predetermined time in relation to the reception of the first assignment information related to the one or more second data transmissions.

24. An apparatus according to claim 19, and the at least one memory and the computer program code further configured, with the at least one processor, to cause the apparatus to:
   detect suspend information related to at least the one of the one or more first data transmissions; and
   suspend the causing of transmission of at least the one of the one or more first data transmissions.

25. An apparatus according to claim 24, wherein the suspend information is detected based on information provided in the second assignment information, or based on the elapsed time since the reception of the first assignment information.

26. An apparatus according to claim 19, and the at least one memory and the computer program code further configured, with the at least one processor, to cause the apparatus to use a predetermined identifier for detection of second assignment information on a downlink control channel.

27. An apparatus comprising:
   at least one processor; and
   at least one memory including computer program code, the at least one memory and the computer program code configured, with the at least one processor, to cause the apparatus to perform at least the following:
   cause, in a wireless communication system related to one or more first data transmissions, transmission of first assignment information indicative of attributes of the one or more first data transmissions, and comprising assignment information indicative of at least one contents attribute of at least one of the one or more first data transmissions;
   cause, subsequent to the transmission of the first assignment information comprising the at least one contents attribute, transmission of second assignment information comprising assignment information indicative of one or more time attributes of the one of the one or more first data transmissions;
   wherein the second assignment information is indicative of an offset attribute controlling a time offset or minimum time offset between the reception of the second assignment information and the causing of transmission of the one of the one or more first data transmissions.

28. An apparatus according to claim 27, wherein the at least one contents attribute is indicative of at least one of:
   selection information for payload selection,
   an identifier identifying a process in a hybrid automatic repeat request scheme,
   a new data indicator of a process in a hybrid automatic repeat request scheme, or
   an indication of a redundancy version of a hybrid automatic repeat request scheme.

29. An apparatus according to claim 27,
   wherein the second assignment information is transmitted from an access node of a cellular system in a first transmission time interval, and
   the one of the one or more first data transmissions is available at the access node in a second transmission time interval; and wherein the time difference between the second transmission time interval and the first transmission time interval is less than a minimum scheduling delay, and wherein the minimum scheduling delay is predetermined or preconfigured at least for communication between the access node and a communication device for the time difference between transmission of first assignment information, comprising the at least one contents attribute from the access node, and availability of a data transmission processed according to such first assignment information at the access node.

30. An apparatus according to claim 27, and the at least one memory and the computer program code further configured, with the at least one processor, to cause the apparatus to:
cause transmission of configuration information indicative of use or non-use of second assignment information related to one or more second data transmissions;
cause, related to the one or more second data transmissions, transmission of first assignment information indicative of attributes of the one or more second data transmissions, and comprising assignment information indicative of at least one contents attribute of one of the one or more second data transmissions;
use the at least one contents attribute for at least partial processing of the one of the one or more second data transmissions; and
receive, in response to non-use of second assignment information related to the one or more second data transmissions being configured, the one of the one or more second data transmissions at a predetermined time in relation to the transmission of the first assignment information related to the one or more second data transmissions.

31. An apparatus according to claim 27, and the at least one memory and the computer program code further configured, with the at least one processor, to cause the apparatus to cause transmission of suspend information related to at least the one of the one or more first data transmissions.

32. An apparatus according to claim 27, wherein the second assignment information comprises the suspend information.

33. An apparatus according to claim 27, and the at least one memory and the computer program code further configured, with the at least one processor, to cause the apparatus to cause transmission of further assignment information related to at least the one of the one or more first data transmissions comprising assignment information indicative of at least one new or modified attribute of the one of the one or more first data transmission.

34. An apparatus according to claim 27, and the at least one memory and the computer program code further configured, with the at least one processor, to cause the apparatus to use a predetermined identifier for indication of second assignment information on a downlink control channel.

* * * * *